US008082271B2

(12) United States Patent
Chan

(10) Patent No.: US 8,082,271 B2
(45) Date of Patent: Dec. 20, 2011

(54) DATA RETRIEVAL APPARATUS FOR SELECTING GEOGRAPHICAL LOCATION INFORMATION ON A GLOBE

(76) Inventor: Raymond Chan, Hong Kong (CN)

( * ) Notice: Subject to any disclaimer, the term of this patent is extended or adjusted under 35 U.S.C. 154(b) by 647 days.

(21) Appl. No.: 12/177,120

(22) Filed: Jul. 21, 2008

(65) Prior Publication Data

US 2009/0024635 A1    Jan. 22, 2009

Related U.S. Application Data

(63) Continuation-in-part of application No. 11/210,803, filed on Aug. 25, 2005, now Pat. No. 7,895,222.

(51) Int. Cl.
*G06F 7/00* (2006.01)
*G06F 17/30* (2006.01)
*G06F 12/00* (2006.01)

(52) U.S. Cl. ......... 707/781; 707/825; 707/916; 707/919

(58) Field of Classification Search ......... 707/805, 707/825, 999.001–999.005, 781
See application file for complete search history.

(56) References Cited

U.S. PATENT DOCUMENTS

| | | | |
|---|---|---|---|
| 5,945,985 A * | 8/1999 | Babin et al. ............... | 715/209 |
| 6,527,555 B1 * | 3/2003 | Storm ....................... | 434/131 |
| 6,847,883 B1 * | 1/2005 | Walmsley et al. ........ | 701/200 |
| 2003/0034879 A1 * | 2/2003 | Rangarajan et al. ...... | 340/7.56 |
| 2005/0089827 A1 * | 4/2005 | Blum ........................ | 434/142 |
| 2008/0090219 A1 | 4/2008 | Wilson et al. | |

FOREIGN PATENT DOCUMENTS

| | | |
|---|---|---|
| GB | 2378305 A | 2/2003 |
| JP | 3863155 B | 12/2006 |

* cited by examiner

*Primary Examiner* — Mohammad Ali
*Assistant Examiner* — Kannan Shanmugasundaram
(74) *Attorney, Agent, or Firm* — Eagle IP Limited; Jacqueline C. Lui

(57) ABSTRACT

Data retrieval apparatus comprises a base unit e.g. a geographic globe having a surface bearing a set of index information, and a pen-like operator separate from and co-operable wirelessly with the globe. The operator has a sensor for sensing the index information when it is brought close to the globe surface, a memory device for storing data information associated with the index information for retrieval based on a reference to the index information sensed by the sensor, a controller for retrieving said data information from the memory device by reference to the index information sensed by the sensor, and a speaker for announcing said data information retrieved by the controller.

19 Claims, 15 Drawing Sheets

US 8,082,271 B2

DATA RETRIEVAL APPARATUS FOR SELECTING GEOGRAPHICAL LOCATION INFORMATION ON A GLOBE

CROSS-REFERENCE TO RELATED APPLICATION

This application is a continuation-in-part of U.S. Ser. No. 11/210,803, filed on Aug. 25, 2005, now U.S. Pat. No. 7,895,222, which is hereby incorporated by reference herein in its entirety.

FIELD OF INVENTION

The present invention relates to data retrieval apparatus that is particularly, but not exclusively, for educational use.

BACKGROUND OF INVENTION

Data retrieval apparatus of the type concerned are known in general. Most of these apparatus comprise a globe and a pen connected by an electric cable to the globe for selecting a geographical location on the globe to cause a built-in speaker of the globe to play voice information relevant to the selected location.

The invention seeks to provide improved data retrieval apparatus.

SUMMARY OF THE INVENTION

According to the invention, there is provided a data retrieval apparatus, which comprises a base unit having a globe whose surface bearing a predetermined set of index information on geographical areas on the globe, and a handheld operator. The base unit further includes a memory device for storing data information associated with the index information, a controller for retrieving from the memory device the data information, a first wireless receiver connected to the controller and a second wireless receiver for communicating with a remote network. The second wireless transceiver is connected to the controller. The handheld operator further contains a sensor for sensing the index information when the sensor is brought close to the surface of the base unit, and a first wireless transmitter which sends the index information to the first wireless receiver in the base unit. When the first wireless receiver receives the index information from the first wireless transmitter, the controller retrieves from the memory device the data information based on a first reference to the index information sensed by the sensor and displays the data information on the display unit.

In another aspect of the current invention, a data retrieval system includes a data retrieval apparatus, a first network, a central server, and a second network. The data retrieval apparatus includes a surface containing selected locations bearing a predetermined set of index information. The apparatus is configured to display data information on a display unit according to corresponding index information selected by a user on the surface. The first network is connected to the data retrieval apparatus. The central server is connected to the first network. The second network is connected to the central server. When the user selects a piece of the index information on the data retrieval apparatus, the data retrieval apparatus requests and receives from the central server the data information and image, whereby information corresponding to any selected location can be displayed by the data retrieval apparatus.

The current invention adopted an interactive and intuitive and interesting way of learning geographical knowledge and the likes, which is to make selection of object by viewing the geographical representation and "touch" it. Whenever the user sees a location or geographical area on the globe that is of interest, he can directly point to that area in a very straightforward way, without even the need of knowing the name of that area. In this way, the user no longer needs to input the desired item by keyboard, nor does he need to use a pointer or mouse to choose the desired item in a list or a table in a computer format.

In another aspect, the data retrieval system in this invention provides an efficient and most updated source for grasping the information concurrently updated in the world, due to a real-time retrieval feature When a user is interested in the real-time and latest information, such as the live scene of a city, he can obtain that information quickly via the globe network, and in at the same time he can still use the simple and intuitive way of visually selecting the geographical locations.

BRIEF DESCRIPTION OF FIGURES

The invention will now be more particularly described, by way of example only, with reference to the accompanying drawings, in which.

DETAILED DESCRIPTION OF THE PREFERRED EMBODIMENTS

Figure 1:
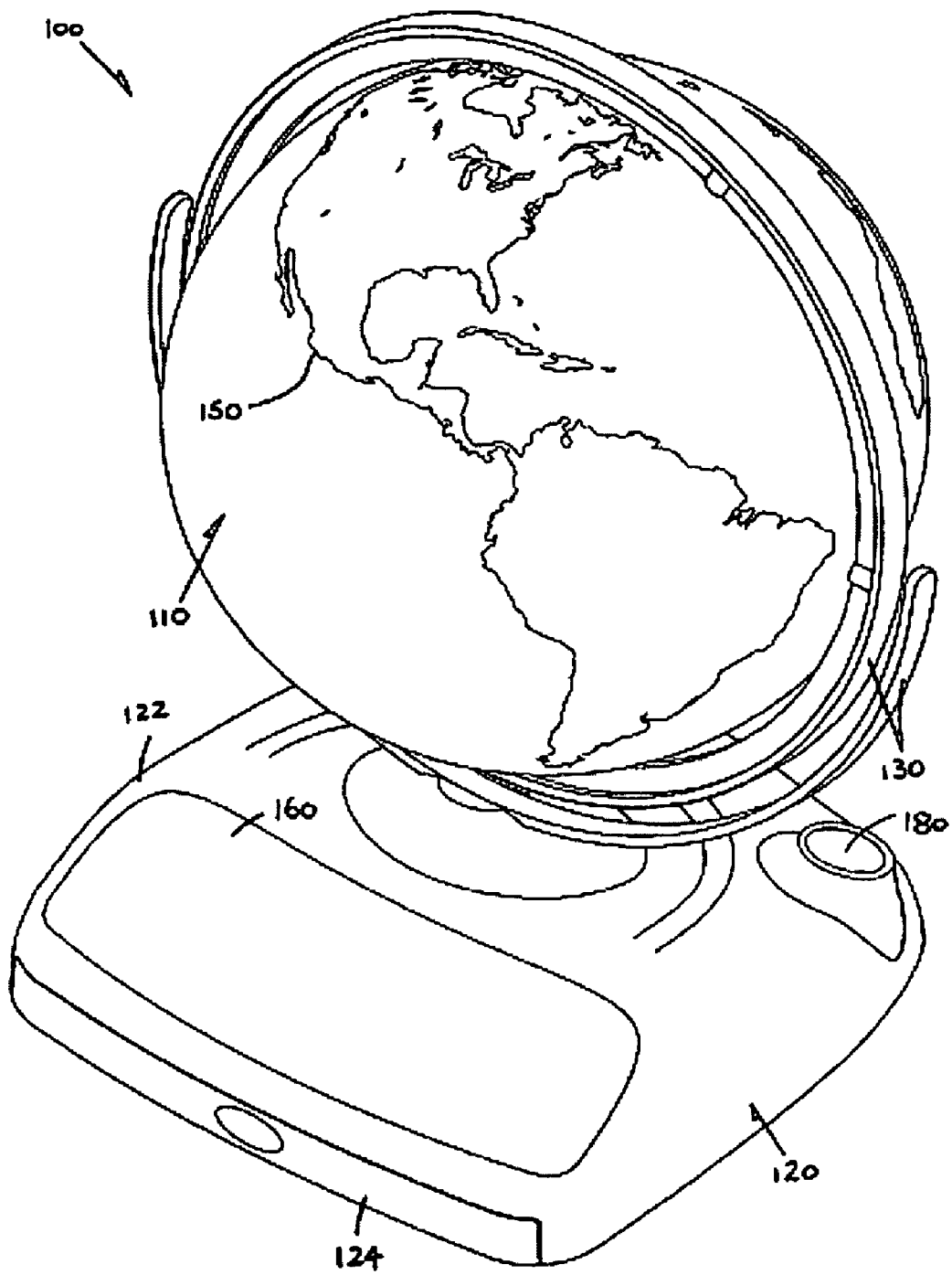
FIG. 1 is a front perspective view of a base unit of an embodiment of data retrieval apparatus in accordance with the invention.
Figure 2:
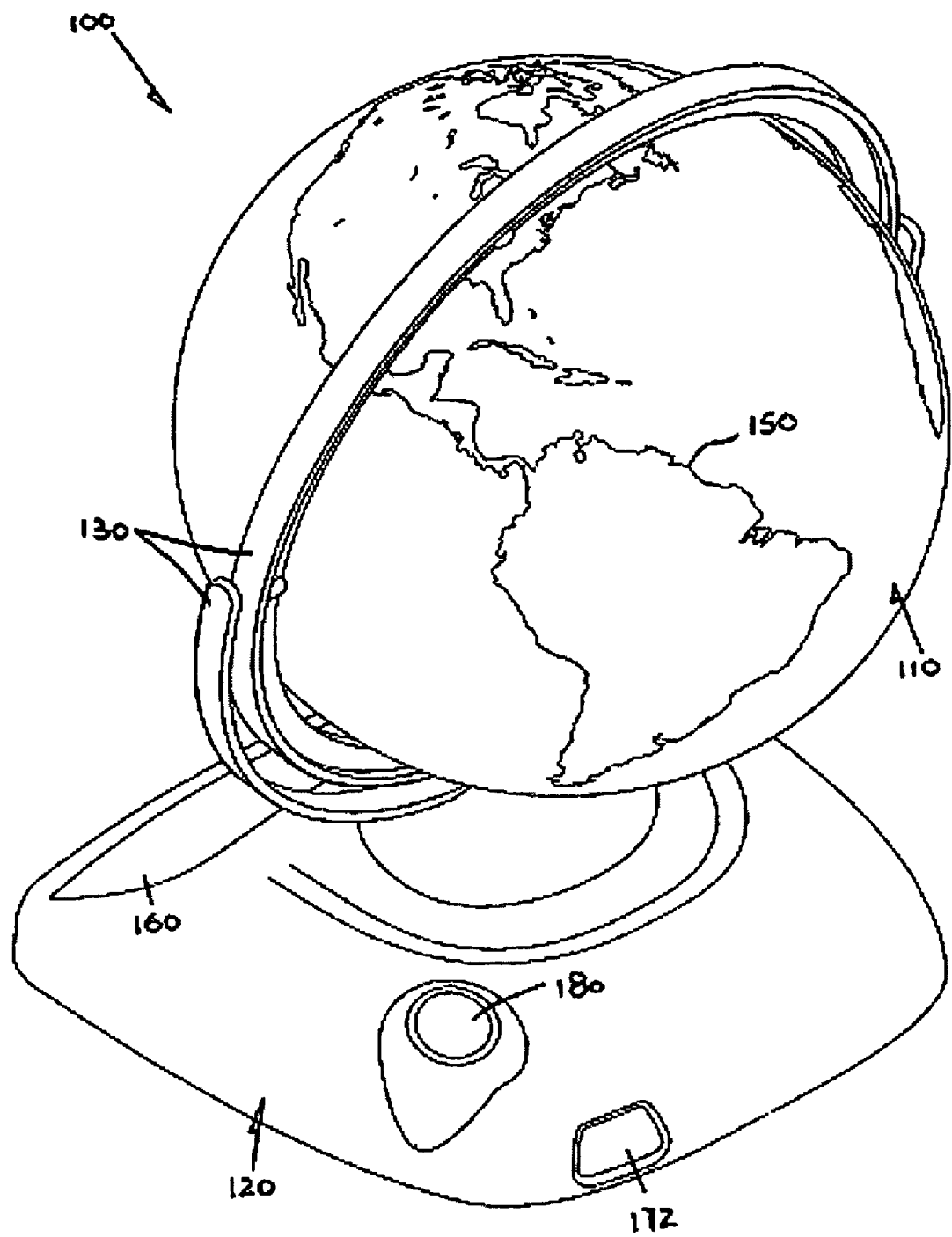
FIG. 2 is a rear perspective view of the base unit of FIG. 1.

Referring to the drawings, there is shown data retrieval apparatus embodying the invention, which comprise a base unit in the form of a geographic globe 100 and a handheld pen-shaped operator or a pen 200 in short that is wireless and separate from and is co-operable wirelessly with the globe 100. The globe 100 has a spherical body 110 whose outer surface bears a map of the world 150 which is encoded with a predetermined set of index information i.e. geographical information that represents the various parts of the world. The globe 100 includes a generally flat base 120 which supports the spherical body 110 for free 360° spinning in all directions on two, vertical and horizontal axes by means of a cross-pivot system 130 as is generally known in the art.

The world map 150 is printed on the globe body 110 employing a dot coding scheme using four colors which are red, blue and yellow for the various pictorial graphical features of the map 150 and include black as dots printed on the red, blue and yellow layers. The black dots are arranged in repeating patterns to form codes, i.e. the index information, which are readable by the pen 200 to identify the various locations i.e. continents, countries, capitals and cities, etc. for data retrieval. The layer of index dots has a tone that is tuned as light as possible to be indiscernible so as not to affect the original picture colors of the map 150.

Figure 3:
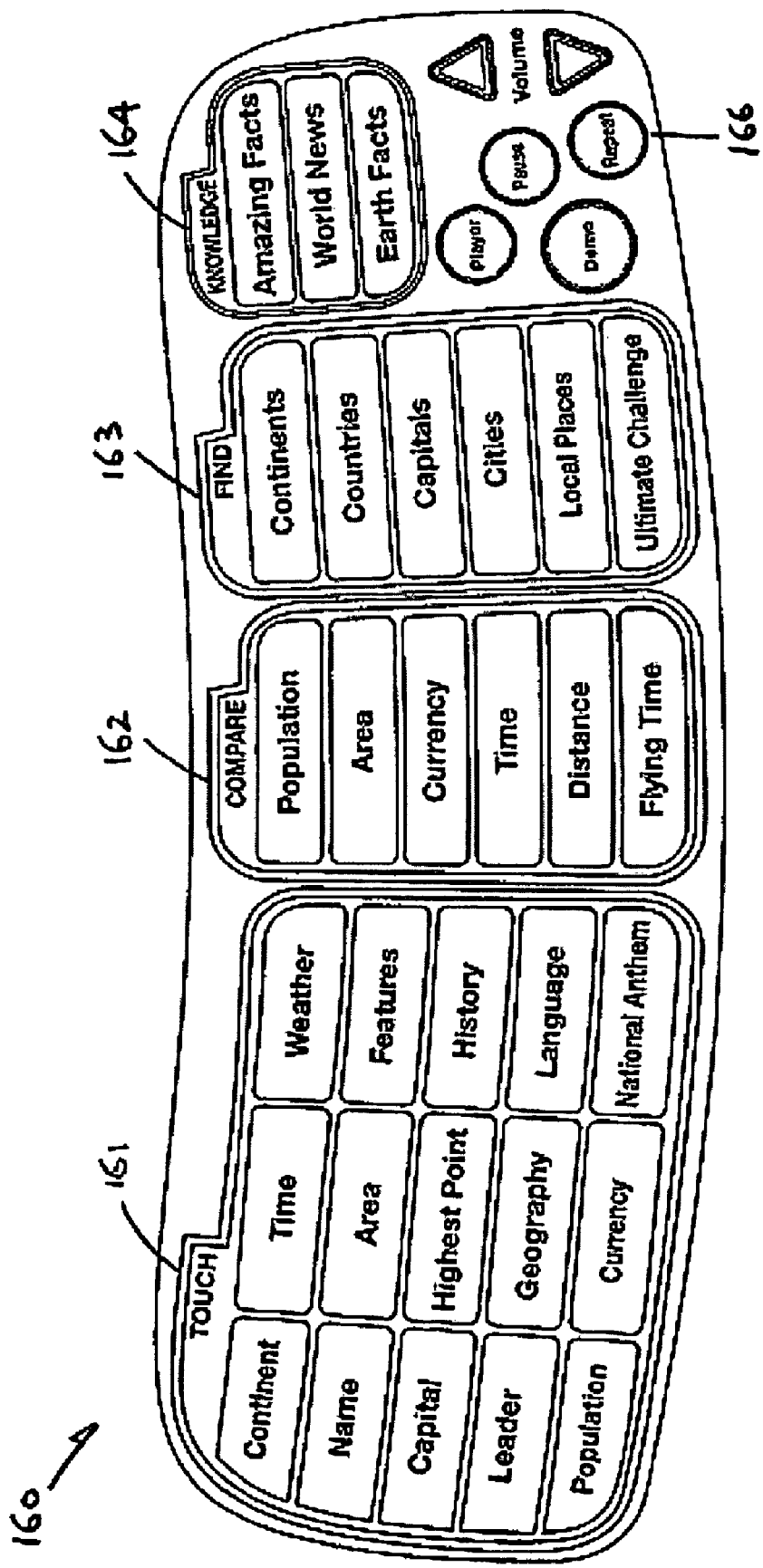
FIG. 3 is a top plan view showing an operation panel of the base unit of FIG. 1.
Figure 4:
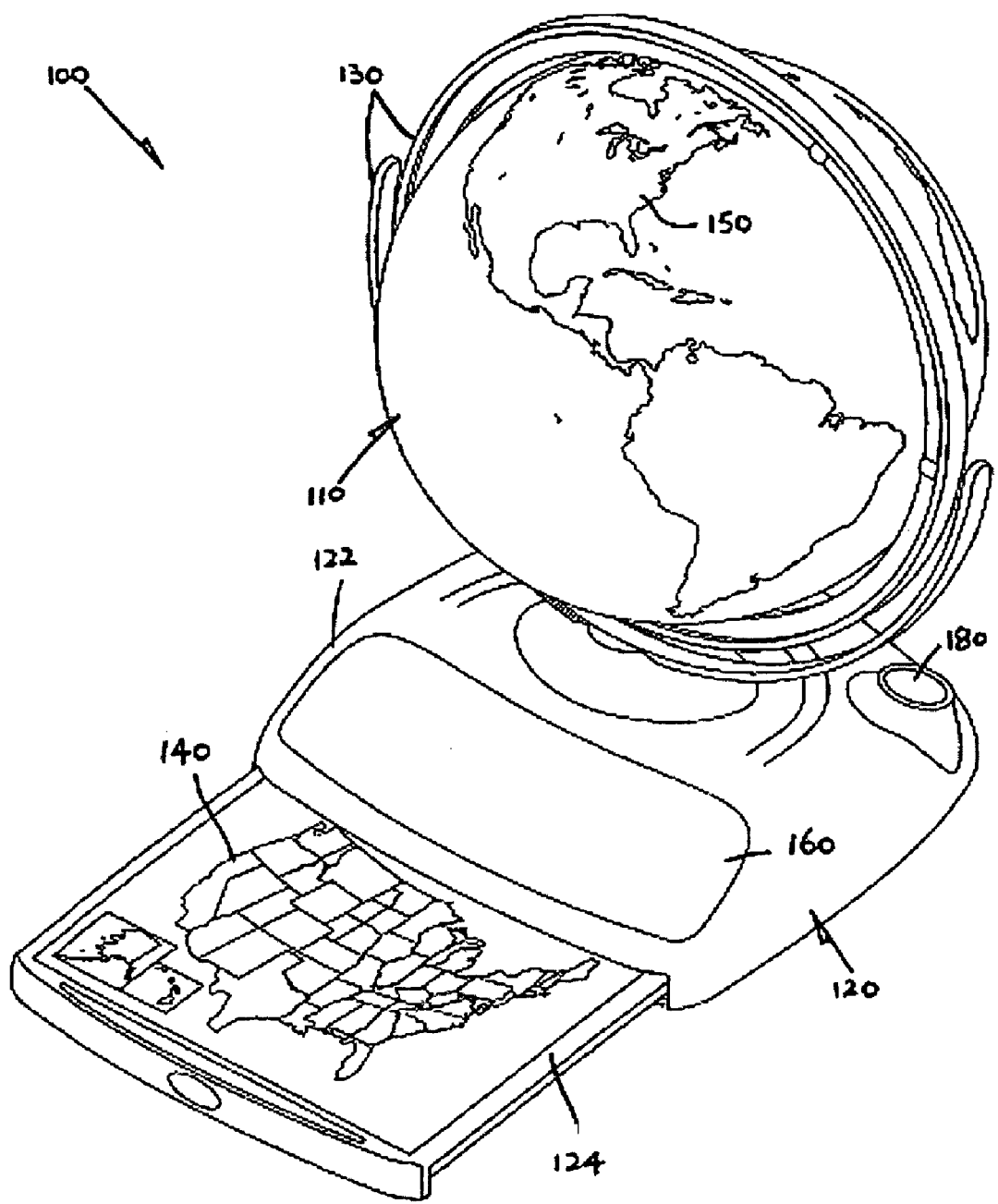
FIG. 4 is a front perspective view of the base unit of FIG. 1, with a local map thereof revealed.
Figure 5:
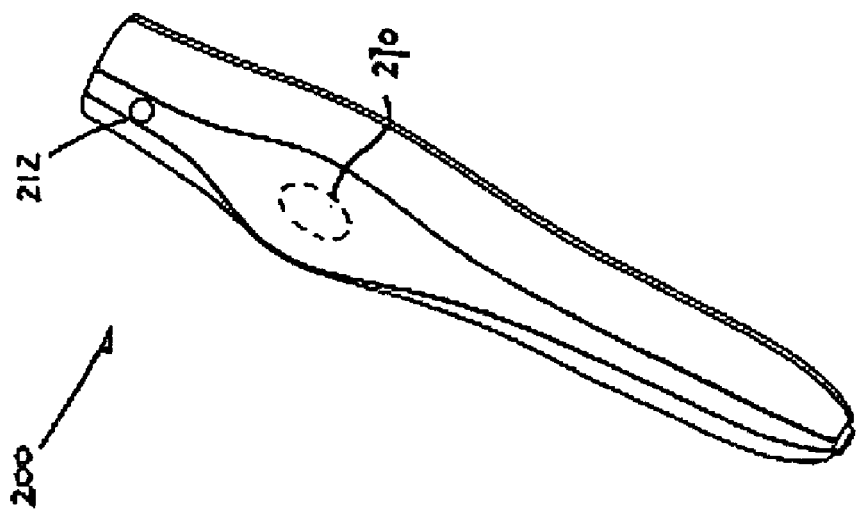
FIG. 5 is a front perspective view of an operator of the data retrieval apparatus for use with the base unit of FIG. 1.
Figure 6:
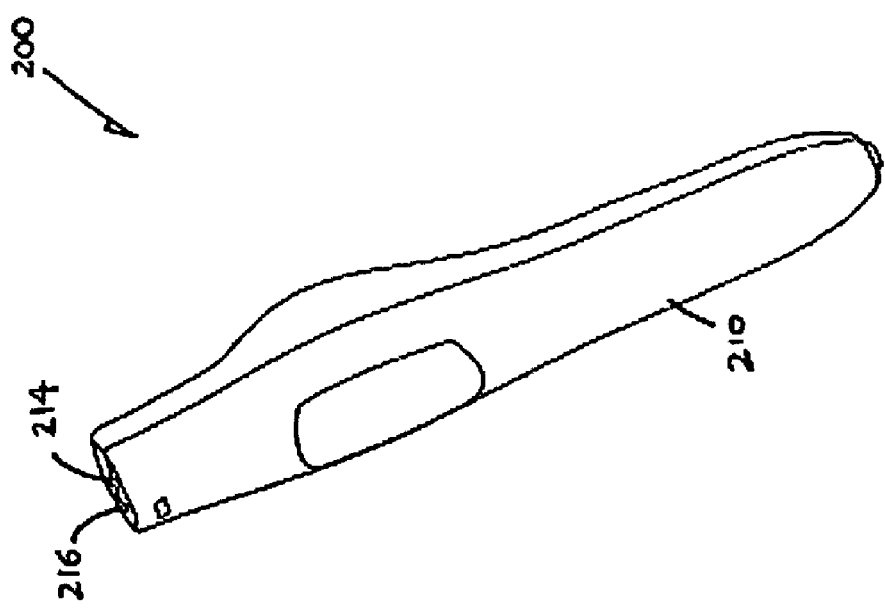
FIG. 6 is a rear perspective view of the operator of FIG. 5.

The globe base 120 has, on its front part, a sloping upper surface 122 which bears an operation panel 160. The panel 160 is provided by a label printed with a pattern of four groups of game/information activity buttons i.e. TOUCH, COMPARE, FIND and KNOWLEDGE buttons 161 to 164 and six control keys 166, using the same dot coding scheme as the world map 150 for reading by the pen 200 in the same manner. The activity buttons 161 to 164 are named according to the categories or types of data that the corresponding activities are to perform upon as shown in FIG. 3, and are encoded individually for user's selection to input the chosen activity commands with desired data types to the pen 200. Similarly, the control keys 166 are named as shown, and encoded, to indicate the control to implement at the pen 200, namely Player (for user's age group selection), Pause, Demo, Repeat and Volume up and down.

The globe base 120 includes a horizontal board 124 which is slidable into and out of the base's body like a draw.

The upper surface of the board 124 has a label stuck thereon, which is printed with a local map 140 using the same dot coding scheme as the world map 150 and operation panel 160 for reading by the pen 200 likewise in the same manner. The local map 140 is normally hidden but it may be revealed by pulling out the board 124.

Compared with the world map 150, the local map 140 shows more detailed geographical information about the country in which the subject data retrieval apparatus is marketed (and used), for example information about the member states for the United States of America. The local map 140 offers an alternative to the world map 150, providing a set of additional index information for data retrieval at the pen 200.

Figure 7:
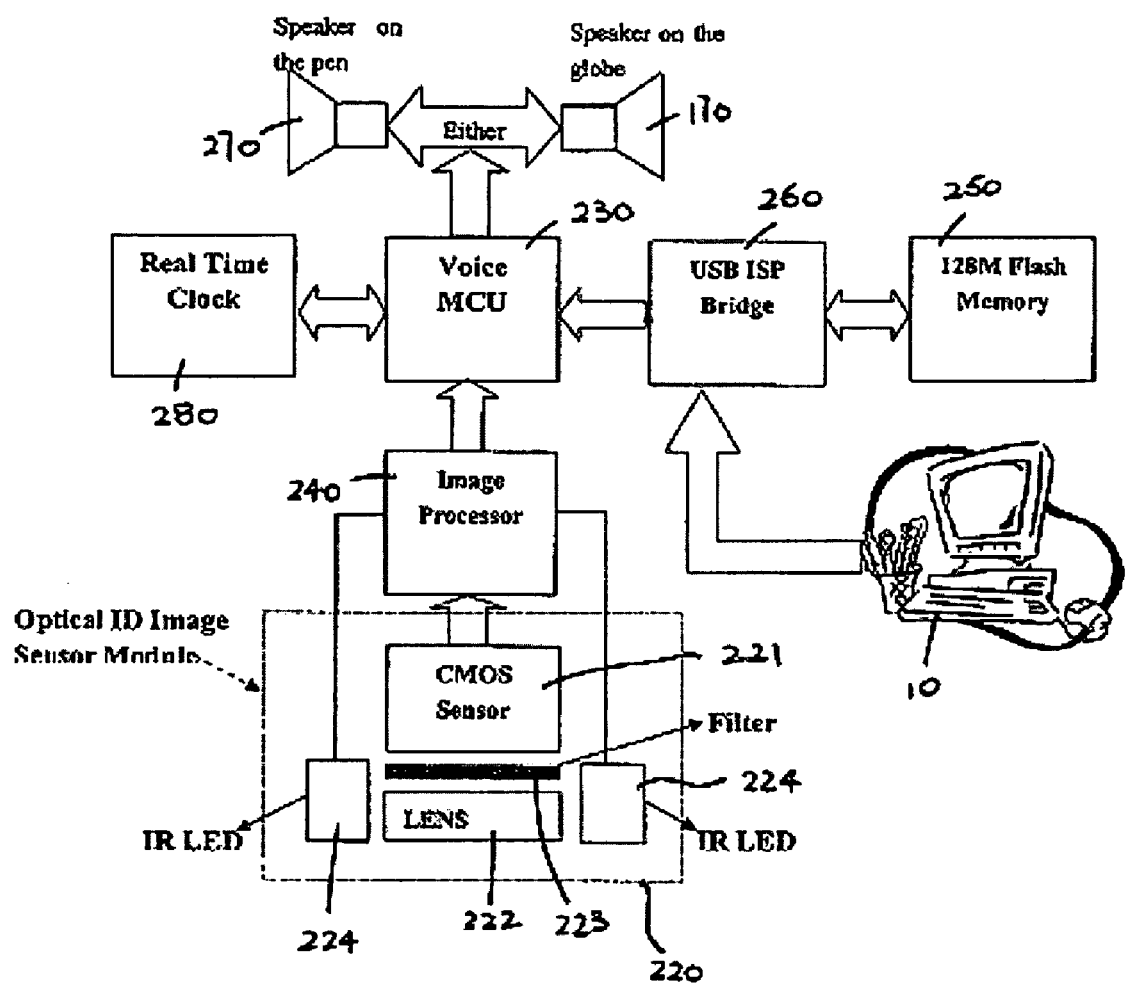
FIG. 7 is a schematic functional block diagram of the operating circuitry of the data retrieval apparatus.

The globe base 120 further includes an internal speaker 170 (see FIG. 7) and an associated speaker jack 172 at the back, as well as a cradle 180 for locating the pen 200 upright on the base 120.

The pen 200 has an elongate casing 210 for holding by a user and an optical ID image sensor module 220 located within the tip (i.e. lower end) of the casing 210 for image capturing. The sensor module 220 is formed by a CMOS sensor 221, a camera lens 222, a filter 223 between the sensor 221 and the lens 222, and a pair of IR LEDs 224 on opposite sides of the lens 222. The IR LEDs 224 are arranged to emit IR light at a surface bearing an image close to which the lens 222 is pointed at, with the IR light reflected from the surface detected by the sensor 221 through the lens 222 and filter 223, whereby the image is captured.

The pen 200 includes, as housed or supported within the casing 210, a voice MCU (microprocessor control unit) 230 for control and operation including voice processing, an image processor 240 for processing (e.g. decoding or recognizing) an image captured by the sensor module 220 and then feeding the same to the voice MCU 230, a 128 Mb flash memory 250 for storing data information and connected to the voice MCU 230 via a USB ISP bridge 260, and a speaker 270 connected to the voice MCU 230 for announcing the data information stored in the memory 250. The data information stored in the memory 250 is essentially voice data that comprises sound effects, human voices and music data, all preferably being stored as wave files. The flash memory 250 also serves to store the appropriate programs, codes and data, etc., such as system music and sounds, as required for the operation and functioning of the pen 200.

There is a real time clock 280 connected to the voice MCU 230, which keeps the real time for the system.

The USB ISP bridge 260 is an in-system programming chip for USB downloading of program to nor-flash memory. In the operating circuitry of the pen 200, the bridge 260 is connected as an interface in circuit with the voice MCU 230 and the flash memory 250 for the MCU 230 to receive data from the memory 250. More importantly, the bridge 260 also enables connection of the pen 200 using a USB cable to a user's PC (personal computer) 10 which is in turn connected to the Internet such that updated data information and programs, etc. can be downloaded, to update the content of the flash memory 250, via the PC 10 and the Internet from a remote server which runs an online website/platform to serve and provide supports to general users of the subject data retrieval apparatus. The time kept by the pen's clock 280 can also be synchronized by or via the PC 10, preferably automatically each time when the pen 200 is connected to the PC 10.

The pen 200 is battery-operated and includes a power on/off button 212 on the same side as the speaker 270 and an audio jack 214 and a USB socket 216 both at the upper end of the pen casing 210. The built-in speaker 270 is convenient to use but is power draining, and it will be disconnected upon insertion into the audio jack 214 of, for example, the plug of an earphone for private/quiet enjoyment. The USB socket 216 forms part of the USB ISP bridge 260 for USB connection.

In operation, the pen 200 is brought close to and pointed at a desired geographic location of the world map 150, or the local map 140, such that the sensor module 220 at the pen tip captures the index dots printed over that position and then outputs the associated 8-bit raw data through a 2-bit data bus from the CMOS sensor 221 to the image processor 240. In response, the image processor 240 decodes the raw data received from the sensor module 220 using a specific signal processing algorithm and then passes the decoded data to the voice MCU 230.

The user should also select the desired activity and data type by tapping the pen 200 at the relevant button 161/162/163/164 on the operation panel 160. In doing so, the pen's sensor module 220 captures the associated dot code and outputs the corresponding raw data to the image processor 240 and then the image processor 240 decodes the raw data and passes the decoded data to the voice MCU 230.

The aforesaid selections of geographic location and of activity and data type can be performed in the reversed order. At the completion of these two user's actions, the voice MCU 230 will recognize and act on the command and data received from the image processor 240 by executing the chosen activity function and retrieving the appropriate voice/sound/music data file from the flash memory 250 and finally announcing or playing the corresponding audio segment at the speaker 270.

As an alternative to the pen speaker 270, the speaker 170 of the globe 100 can be used by connecting an audio cable between the audio jack 214 of the pen 200 and the speaker jack 172 of the globe base 120. The globe speaker 170 will provide a better sound quality. Or, as mentioned above, an earphone can be used instead, connected to the pen's audio jack 214.

The operation of the subject data retrieval apparatus will now be described in further detail.

There are 30 activities, namely TOUCH (×15), COMPARE (×6), FIND (×6), World News (×1), Amazing Facts (×1) and Earth Facts (×1), all of which are selectable using the activity buttons 161 to 164. For a first time user, the default age group is "5-8". Upon tapping the Player key 166, the pen 200 will play "To change the number of player, press this button again" and then "Player+One, Two, Three, Four". Upon tapping the "Time" button 161 of the TOUCH activity, the pen 200 will play "Time hasn't been set yet. Please connect to your PC to download our latest information."

Each product of the subject data retrieval apparatus is accompanied by an installation CD for installation before use, including installing an associated operation program and relevant drivers, etc. on the PC 10 for use with the pen 200 and loading an initial set of data information (from the CD) into the pen's flash memory 250. A unique access code is assigned to the apparatus, as appearing on the CD cover. The user should initially enter the access code into the operation program and then follow the on-screen instructions to register and activate the code. In particular, the user will be asked to select his/her age group and to press a download button to start download.

Figure 8:
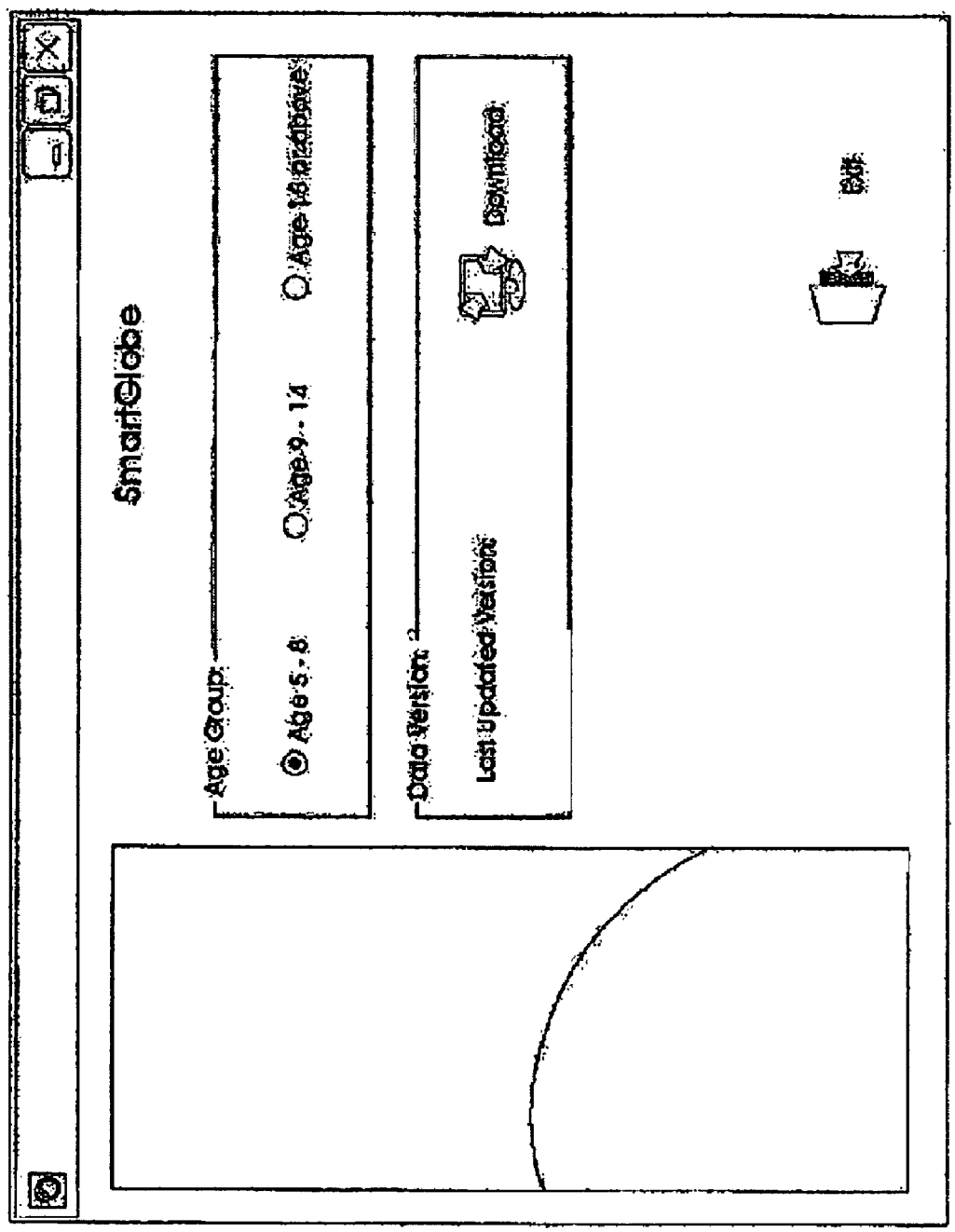
FIG. 8 is a screenshot showing a control panel of an operation program associated with the data retrieval apparatus.

In general, upon connection of the pen 200 to the PC 10 that is in turn connected to the Internet, the operation program automatically runs and pops up a data update screen (FIG. 8) on the PC 10 and automatically checks for update on the server by sending information to the server to verify the content version and data specification. The relevant age group for the player is shown or can be selected on screen. The update checking process is run behind the screen. In case there is update information, the PC 10 will prompt and instruct the user to start download. If update is not necessary, the pen 200 will play "No new data available".

There are 15 TOUCH activities. While awaiting player's instructions on this game, the pen 200 will play, as appropriate, "Pick an activity, then touch the Globe for more information", "To start your game, press any button to select an activity" and "Then, touch the Globe for more information".

To start the TOUCH game, the player should tap any one of the TOUCH buttons 161 on the globe base 120 and then select a location on the globe body 110. Taking New York as an example, the pen 200 will play the relevant voice segment as indicated in the following table, which shows the voice segments for all of the 15 data types or topics relative to different player age groups "5-8", "9-14" and "15+" (i.e. age 15 or above).

The topic can be changed at any time by tapping another activity button 161, or a different country can be picked by tapping a new location on the world map 150, whereupon the associated new piece of information is announced.

Example 1

| TOUCH items | Age 5-8 | Age 9-14 | Age 15+ |
|---|---|---|---|
| 1 Continent | | | |
| 2 Name | New York | New York (The Empire State) | Same |
| 3 Capital | Albany | Same | Same |
| 4 Leader | George Pataki | Same | Same |
| 5 Population | Over 19 million | Same | Same |
| 6 Time | (GMT-5) | Same | Same |
| 7 Area | New York is over half the size of the United Kingdom. | Same | Same |
| 8 Highest point | Mr. Marcy is the highest point in New York, it is over four times the height of the Empire State building. | Same | Same |
| 9 Geography | There are mountains in the northeast, where you can find Lake Ontario and Lake Erie. | | |
| 10 Currency | US Dollar | Same | Same |
| 11 Weather | New York has warm summers and cold winters | TBC | TBC |
| 12 Features | New York is home to New York City, which is one of the biggest and most popular cities in the world. | TBC | TBC |
| 13 History | New York was one of the original Thirteen Colonies. The Dutch bought Manhattan from the Indians for some trinkets | TBC | TBC |
| 14 Language | N/A | N/A | N/A |
| 15 National Anthem | The US national anthem | Same | Same |

Example 2

Canada

| TOUCH items | Age 5-8 | Age 9-10 | Age 15+ |
|---|---|---|---|
| 1 Continent | North America | Same | Same |
| 2 Name | Canada | Same | Same |
| 3 Capital | Ottawa | Same | Same |
| 4 Leader | The prime minister of Canada is Paul Martin. | Same | Same |
| 5 Population | Over 32 million | Same | Same |
| 6 Time | (GMT-08:00) | Same | Same |
| 7 Area | Canada + is very big. It's bigger than Australia. | Same | Same |
| 8 Highest point | Mount Logan is about two-thirds the size of Mount Everest, the tallest mountain on Earth. | Same | Same |

-continued

| | | Canada | |
|---|---|---|---|
| TOUCH items | Age 5-8 | Age 9-10 | Age 15+ |
| 9 Geography | Canada is the world's second biggest country, next to Russia. In Canada you'll find large prairies with herds of cattle, golden fields of wheat, tall mountains with snowy tops, huge forests with very old trees, and beautiful fishing villages along the rocky Atlantic and Pacific Ocean coasts | Located in North America, bordering the North Atlantic Ocean on the east, the North Pacific Ocean on the west, and the Arctic Ocean on the north. | Ottawa is located at around 45 27 North latitude and 75 42 West Longitude, in the northern hemisphere. |
| 10 Currency | Canadian Dollar | Same | Same |
| 11 Weather | Canada reaches very far north, so the weather in many places is very cold and snowy all year round. But in southern Canada, near the US border, the weather is more temperate, and changes with each of the four seasons. | The weather varies from temperate to sub-artic to artic. The average temperature of 24 degrees Fahrenheit. (Minus 4 degrees Celsius) | The average annual rainfall is 314 mm. With the average climate ranging from 16 to 31 degrees Fahrenheit. (Minus 8 to 0 degrees Celsius) |
| 12 Features | See the bighorn sheep in the snowy mountains and visit awesome Lake Louise up in the Rocky Mountains to see one of the most beautiful mountain lakes in the world! | The most recognizable icon in Canada is the CN Tower, along with Ontario maple syrup made from 100% pure maple sap, which is very famous. The sugar maple tree is unique to the southeastern part of Canada. | Canada's Royal Canadian Mounted Polices, also called 'Mounties", are a popular national symbol. The most important festival in Canada is the Maple Sugar Festival held in March. |
| 13 History | Canada + had many groups of native inhabitants before Europeans arrived, who lived, hunted and traded throughout the land. | The first inhabitants of Canada were native Indian peoples, primarily the Inuit. Their Independence day is on the $1^{st}$ of July, 1867 | Eastern Canada was settled by both English and French colonists and was ceded to England in 1763 after the Seven Years' War. |
| 14 Language | The official language of Canada is English. Hello! | Same | Same |
| 15 National Anthem | The Canada national anthem | Same | Same |

There are 6 COMPARE activities. While awaiting player's action on this game, the pen 200 will play the voice instruction "To compare the population/Area/Currency/Time/Flying Time", "First location" and "Second location".

To start the COMPARE game, the player should tap any one of the COMPARE buttons 162 on the globe base 120, whereby the type of information to compare is determined, and then select two locations on the world map 150 (or the local map 140). During selection, the pen 200 will announce the name of the first location immediately upon tapping, then play "second point" to request a second location, and subsequently announce the name of second location immediately upon tapping.

Taking China/India, Japan/Italy and United States/Japan as examples, the following table lists the corresponding voice segments that the pen 200 will play in respect of all of the 6 data types to compare. Different player age groups "5-8", "9-14" and "15+" share the same voice segments.

| COMPARE items | Age 5-8 | Age 9-10 | Age 15+ |
|---|---|---|---|
| 16 Population | Population + China + about XXX that of India | " | " |
| 17 Area | Area + India + about + XXX that of + China | " | " |
| 18 Currency | Currency + China + about + XX + that of + India | " | " |
| 19 Time | Japan + about + 13 hours + earlier than + Italy | " | " |
| 20 Distance | United States + about + XXX + Miles + away from Japan | Same | Same |
| 21 Flying Time | The flying time is + about + XXX hour + and + XXX min. | Same | Same |

There are 6 FIND activities, some having three rounds of increasing challenge levels, for up to four players. To start the game, any one of the FIND buttons 163 should be tapped, whereupon the pen 200 will ask a question as shown in the table below and then await an answer. A certain length of time will be given for the player to tap the right place on the globe body 110, namely 90 seconds for the age group "5-8", 60 seconds for the age group "9-14" and 45 seconds for the age group "15+".

In general, ten questions will be asked for each round, except the subject type "Continent" for which there will only be seven questions.

zoo/jungle or animals around a globe, in that the animals are encoded with respective indexes for selective input to the handheld operator to prompt the operator to retrieve and play the relevant pre-recorded voice information relating to those animals, such as their names and habitat.

The pen 200 communicates with the PC 10 via USB connection. It is envisaged that the communication can be implemented using wireless connection technologies, such as the 2.4 GHz radio frequency protocol or the Bluetooth technol-

| TOUCH items | Age 5-8 | Age 9-10 | Age 15+ |
|---|---|---|---|
| 22 Continents | Look for 7 continents; No hints. | Look for 7 continents; No hints. | Look for 7 continents; No hints. |
| 23 Countries | Look for main countries in the world; 2 hints: a) Look in North/South hemisphere b) Look in (Continent) | Look for larger countries in the world; 2 hints: a) Look in North/South hemisphere b) Look in (Continent) | Look for larger countries in the world; 2 hints: a) Look in North/South hemisphere b) Look in (Continent) |
| 24 Capitals | Look for main countries' capitals; 3 hints: a) Look in North/South hemisphere b) Look in (Continent) c) Look in (Country) | Look for larger countries' capitals; 3 hints: a) Look in North/South hemisphere b) Look in (Continent) c) Look in (Country) | Look for countries' capitals; 3 hints: a) Look in North/South hemisphere b) Look in (Continent) c) Look in (Country) |
| 25 Cities | Look for main cities; 3 hints: a) Look in North/South hemisphere b) Look in (Continent) c) Look in (Country) | Look for larger cities; 3 hints: a) Look in North/South hemisphere b) Look in (Continent) c) Look in (Country) | Look for larger cities; 3 hints: a) Look in North/South hemisphere b) Look in (Continent) c) Look in (Country) |
| 26 Local Cities | Look for big cities. 1 hint: Look in city between (cities)/Look in city next to (City) | Look for larger cities. 1 hint: Look in city between (cities)/Look in city next to (City) | Look for cities. 1 hint: Look in city between (cities)/Look in city next to (City) |
| 27 Ultimate Challenge | Mix the above find game | Same | Same |

To play the Amazing Facts, the upper KNOWLEDGE button 164 should be pressed using the pen 200, and then the first/next fact will be played. There are up to 20 facts, which will be updated monthly or bi-weekly. The button 164 is touched once for each new fact. The fact will not repeat until the last one has been played. All the age groups are given access to this activity but with different types of data.

To play the World News, the middle KNOWLEDGE button 164 should be pressed using the pen 200, and then the first/next news will be played. There are up to 10 facts, which will be updated monthly or bi-weekly.

To play the Earth Facts, the lower KNOWLEDGE button 164 should be pressed using the pen 200, and then the first/next news will be played. There are up to 20 facts, which will be updated monthly or bi-weekly.

In this particular embodiment, a globe (100) is employed as the base unit of the subject data retrieval apparatus such that the users can have a feel of geographical locations and directions around the planet. It is envisaged that the base unit can take the form of a book or bound charts, such as a world atlas (akin to the local map 140) so that more encoded index information can be packed into a smaller size.

It should be noted that any other suitable coding schemes for the index information may be adopted, which do not require electrical wire/cable connection of the handheld operator to the base unit.

The subject matter of the data handled by the subject apparatus is unlimited. For example, the base unit can depict a ogy, in which case the bridge 260 is replaced by a suitable RF transceiver or Bluetooth module.

The invention has been given by way of example only, and various other modifications of and/or alterations to the described embodiment may be made by persons skilled in the art without departing from the scope of the invention as specified in the appended claims.

Figure 9:
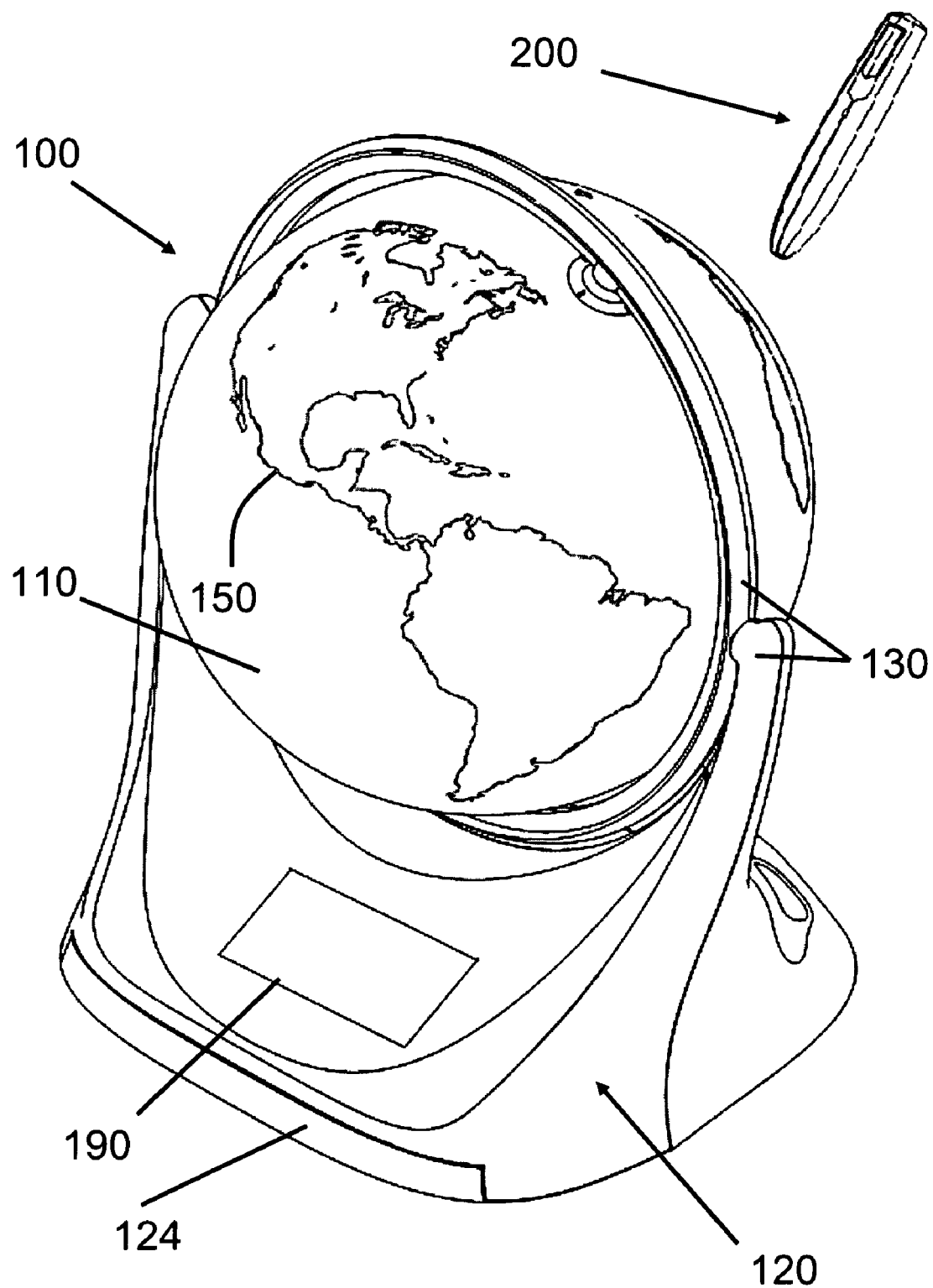
FIG. 9 is a front perspective view of a base unit of another embodiment of data retrieval apparatus in accordance with the invention.
Figure 10:
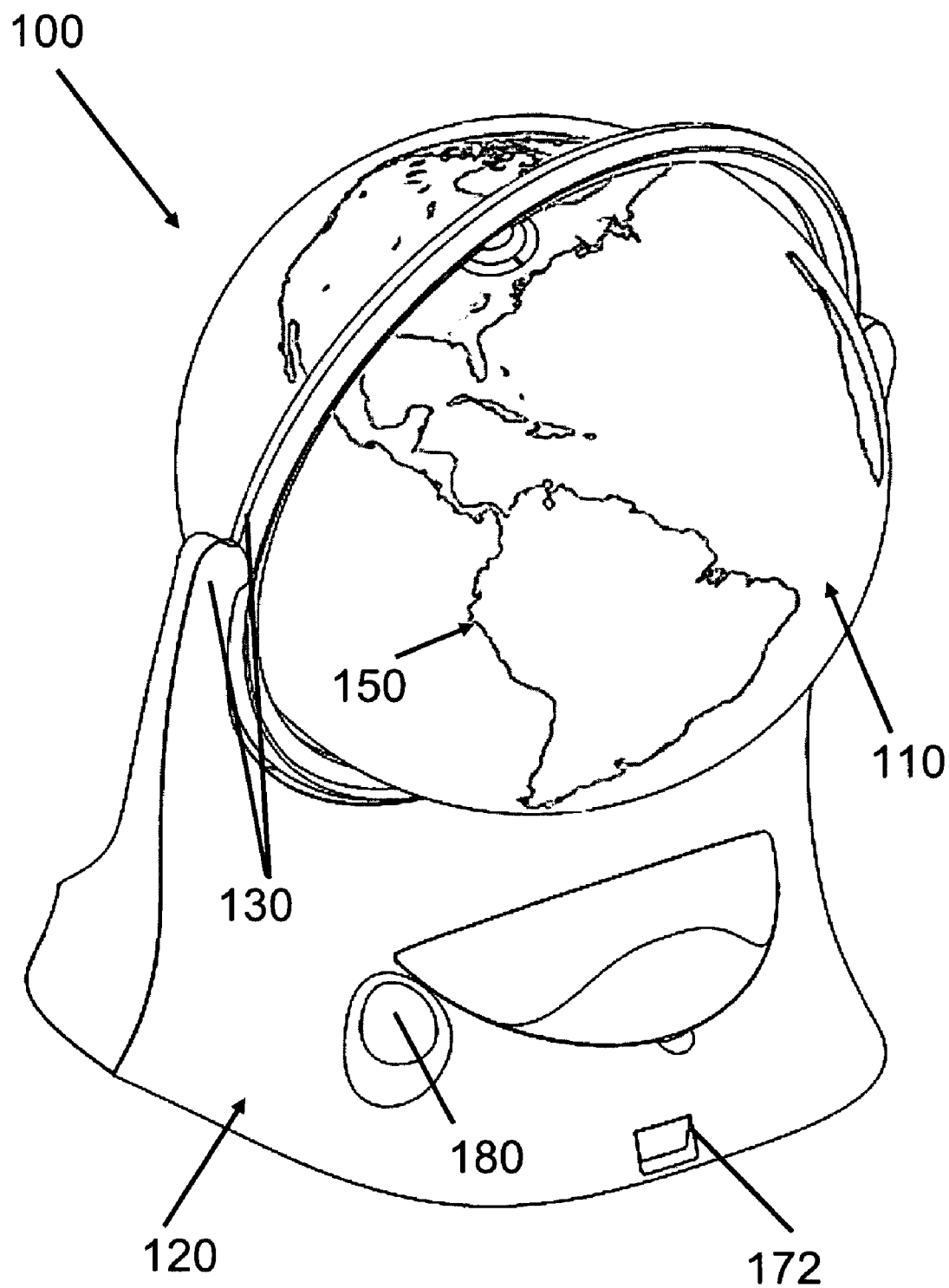
FIG. 10 is a rear perspective view of the base unit of FIG. 9.

Referring to the FIG. 9 and FIG. 10, in another aspect of the invention, there is shown a data retrieval apparatus which comprise a base unit in the form of a geographic globe 100 and a handheld pen-shaped operator or a pen 200 in short that is wireless and separate from and is co-operable wirelessly with the globe 100. The globe 100 has a spherical body 110 whose outer surface bears a map of the world 150 which is encoded with a predetermined set of index information each corresponding to preassigned geographical location on the globe. The globe 100 includes a curved base 120 which supports the spherical body 110 for free 360° spinning in all directions on two, vertical and horizontal axes by means of a cross-pivot system 130 as is generally known in the art. In the front part of the base 120, there is also a Liquid Crystal Display (LCD) screen 190 on the incaved region of the base 120. In the embodiment shown, the LCD screen 190 is a 3.5" Thin Film Transistor (TFT) LCD screen. The base 120 further includes a horizontal board 124 which is slidable into and out of the bases' body like a drawer. The base 120 further includes an internal speaker (not shown) and an associated speaker jack 172 at the back, as well as a cradle 180 for locating the pen 200 upright on the base 120.

The world map 150 is printed on the globe body 110 employing a dot coding scheme using four colors which are red, blue and yellow for the various pictorial graphical features of the map 150 and include black as dots printed on the red, blue and yellow layers. The black dots are arranged in repeating patterns to form codes, i.e. the index information, which are readable by the pen 200 to identify the various locations i.e. continents, countries, capitals and cities, etc. for data retrieval. The layer of index dots has a tone that is tuned as light as possible to be indiscernible so as not to affect the original picture colors of the map 150.

Figure 11:
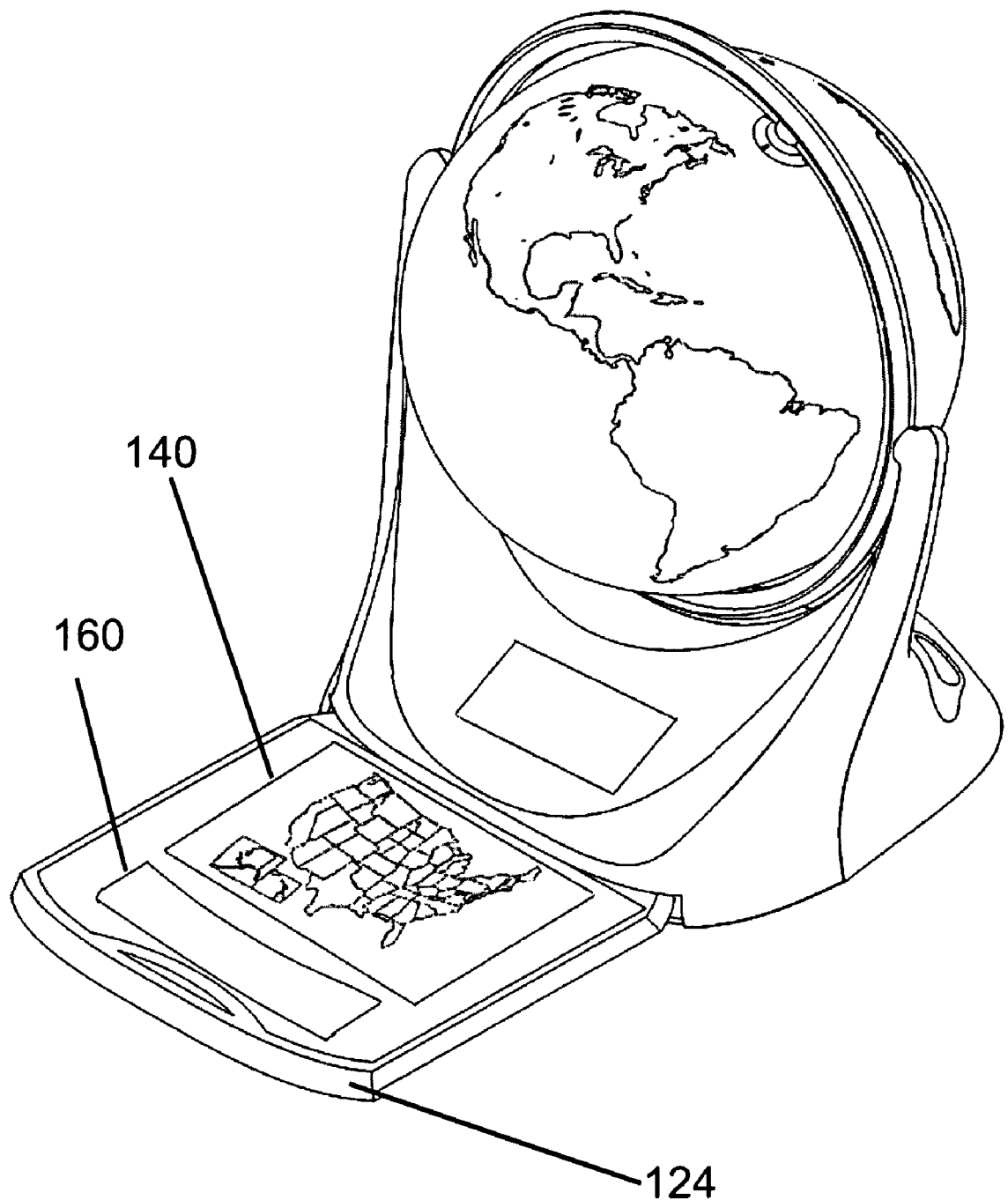
FIG. 11 is a front perspective view of the base unit of FIG. 9, with a slidable horizontal board revealed.

In FIG. 11, the globe base 120 has, on its front part, a horizontal board 124 which bears an operation panel 160 and a local map 140. The upper surface of the board 124 has a label stuck thereon, which is printed with the local map 140 using the same dot coding scheme as the world map 150, as well as operation panel 160 does, for reading by the pen 200 likewise in the same manner. The local map 140 and the operation panel 160 are normally hidden but it may be revealed by pulling out the board 124.

Compared with the world map 150, the local map 140 shows more detailed geographical information about the country in which the subject data retrieval apparatus is marketed (and used), for example information about the member states for the United States of America. The local map 140 offers an alternative to the world map 150, providing a set of additional index information for data retrieval at the pen 200.

Figure 12:
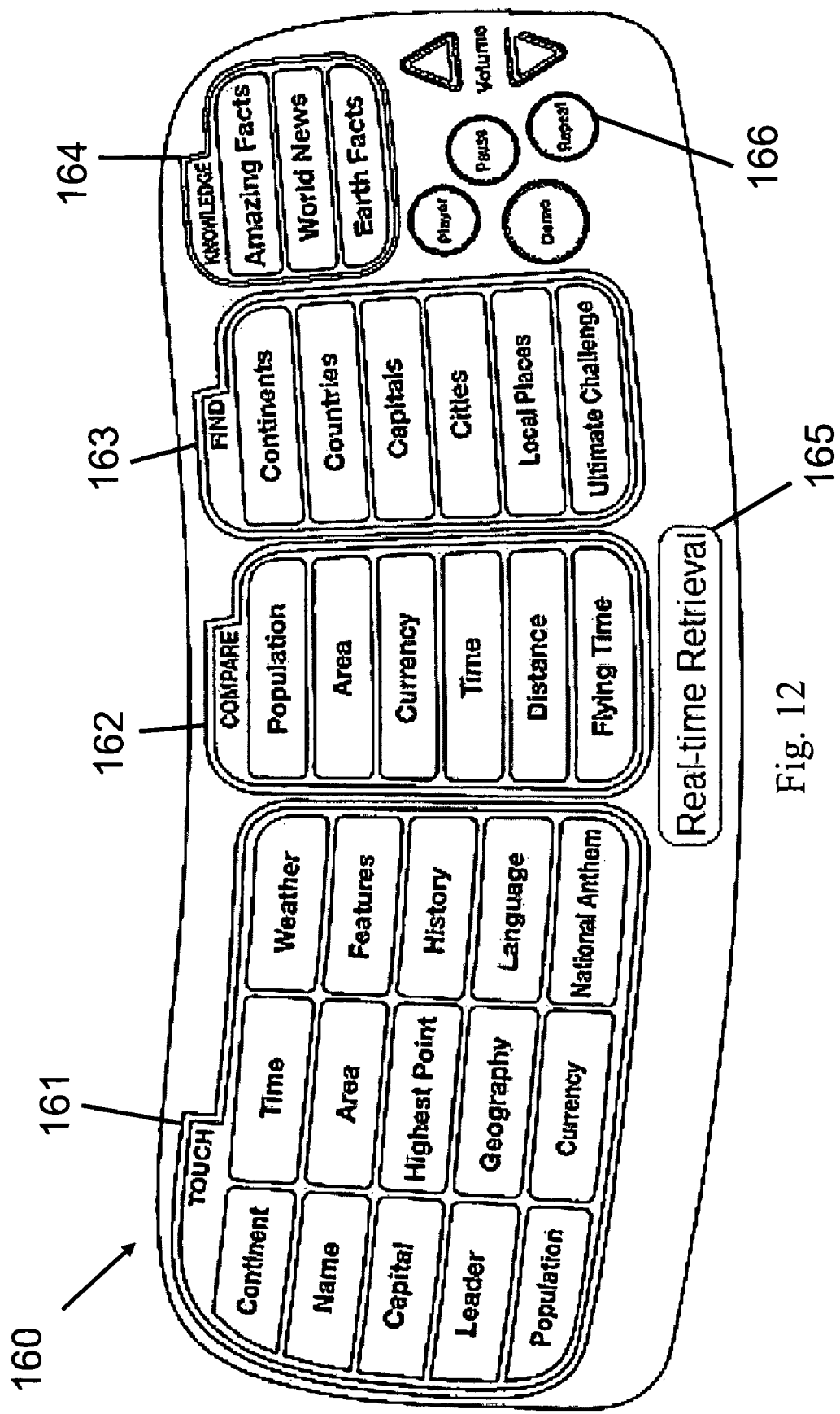
FIG. 12 is a top plan view showing an operation panel of the base unit of FIG. 9.

As shown in the embodiment of FIG. 12, the panel 160 is provided by a label printed with a pattern of four groups of game/information activity buttons i.e. TOUCH, COMPARE, FIND and KNOWLEDGE buttons 161 to 164, six control keys 166, using the same dot coding scheme as the world map 150 for reading by the pen 200 in the same manner, and a separate button 165 which is for real-time retrieval. The activity buttons 161 to 165 are named according to the categories or types of data that the corresponding activities are to perform upon as shown in FIG. 12, and are encoded individually for user's selection to input the chosen activity commands with desired data types to the pen 200. Similarly, the control keys 166 are named as shown, and encoded, to indicate the control to implement at the pen, namely Player (for user's age group selection), Pause, Demo, Repeat and Volume up and down.

Figure 13B:
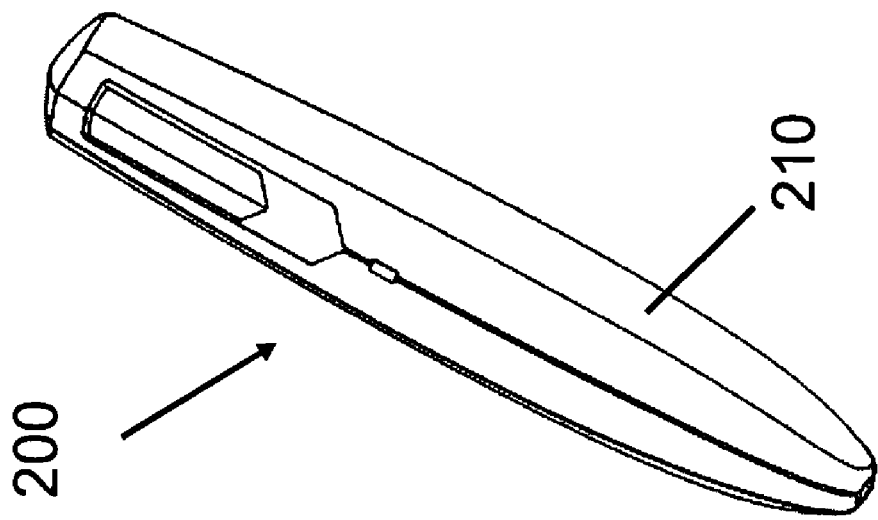
FIG. 13 shows the perspective view of the pen in an embodiment of data retrieval apparatus.
Figure 13A:
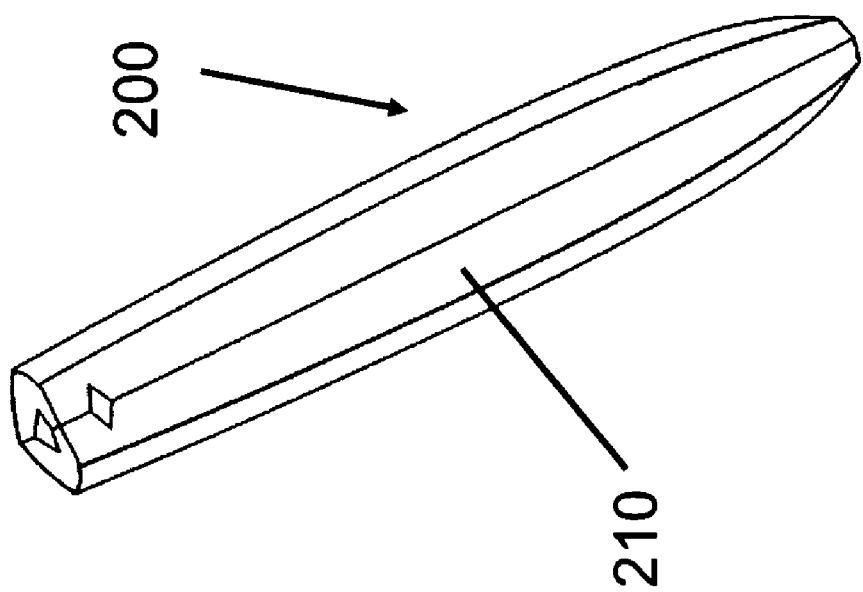
Figure 14:
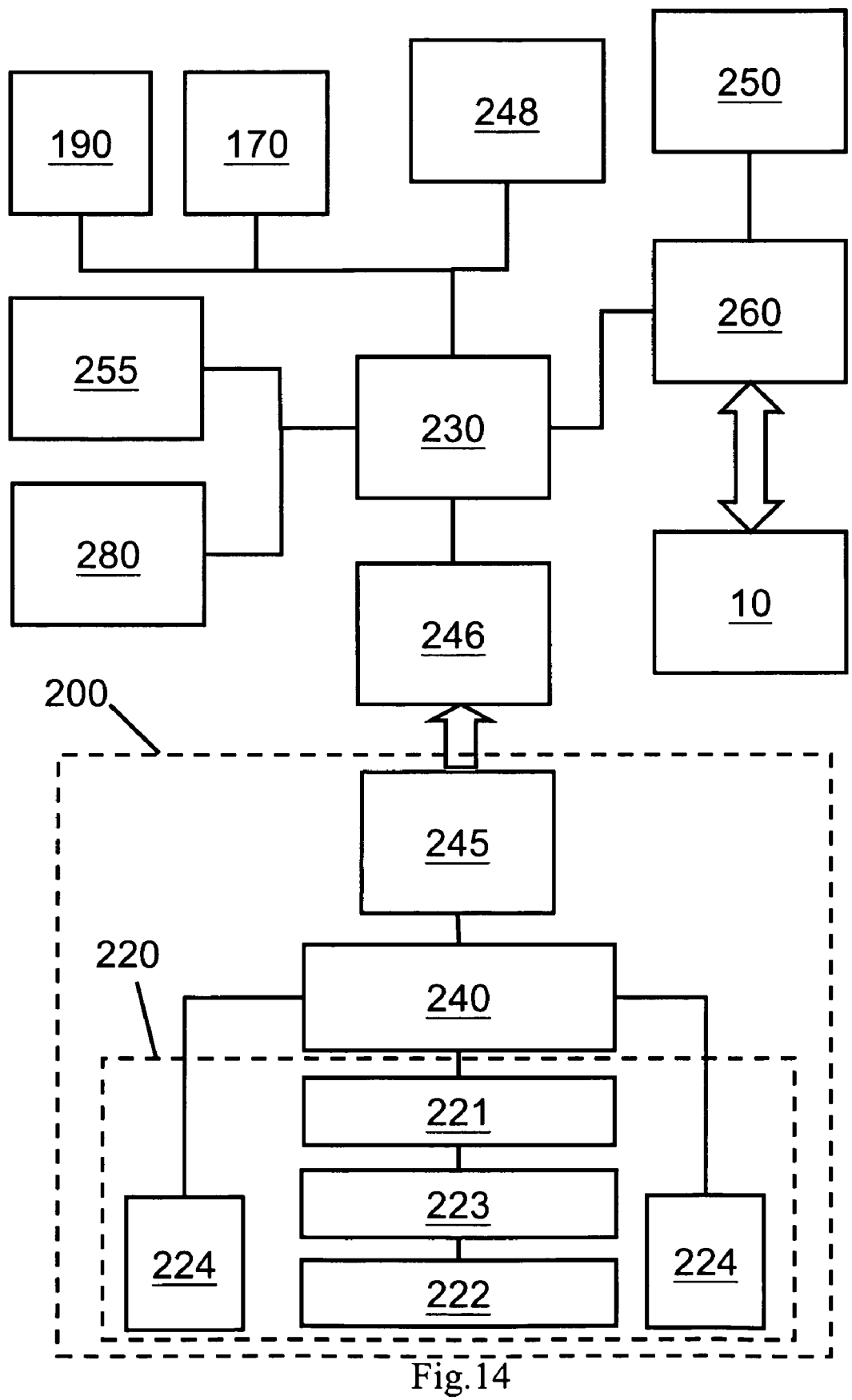
FIG. 14 shows schematic functional block diagram of the operating circuitry of the data retrieval apparatus.

As shown in FIGS. 13a and 13b, the pen 200 has an elongate casing 210 for holding by a user and an optical ID image sensor module 220 located within the tip (i.e. lower end) of the casing 210 for image capturing. Turning now to FIG. 14, the sensor module 220 is formed by a CMOS sensor 221, a camera lens 222, a filter 223 between the sensor 221 and the lens 222, and a pair of infra-red (IR) light emitting diodes (LEDs) 224 on opposite sides of the lens 222. The IR LEDs 224 are arranged to emit IR light at a surface bearing an image close to which the lens 222 is pointed at, with the IR light reflected from the surface detected by the sensor 221 through the lens 222 and filter 223, whereby the image is captured. The pen 200 also includes an image processor 240 for processing (e.g. decoding or recognizing) an image captured by the sensor module 220. The pen 200 also has a wireless transmitter 245 which is preferably a 2.4 GHz wireless transmitter to transmit the index information decoded by the image processor 240 to the globe.

The globe 100 includes, as housed or supported within the base 120, an MCU (microprocessor control unit) 230 for control and operation of other system components, a 2 GB NAND flash memory 250 for storing data information and connected to the MCU 230, a wireless receiver 246 to receive the index information from the pen 200, a wireless WiFi Module 248 for connecting to a remote network, and a speaker 270 and the LCD screen 190 connected to the MCU 230 for announcing and/or displaying the data information stored in the memory 250. The data information stored in the memory 250 can be video and voice or other data that comprises texts, images, animations, video clips, sound effects, human voices and music data. The flash memory 250 also serves to store the appropriate programs, codes and data, etc., such as system music and sounds, as required for the operation and functioning of the pen 200. There is a real time clock 280 connected to the MCU 230, which keeps the real time for the system.

The USB ISP bridge 260 is an in-system programming chip for USB downloading of program to nonflash memory. In the operating circuitry of the globe 100, the bridge 260 is connected as an interface in circuit with the MCU 230 and the flash memory 250 for the MCU 230 to receive data from the memory 250. More importantly, the bridge 260 also enables connection of the globe 100 using a USB cable to a user's PC (personal computer) 10 which is in turn connected to the Internet such that updated data information and programs, etc. can be downloaded, to update the content of the flash memory 250, via the PC 10 and the Internet from a remote server which runs an online website/platform to serve and provide supports to general users of the subject data retrieval apparatus. The time kept by the pen's clock 280 can also be synchronized by or via the PC 10, preferably automatically each time when the pen 200 is connected to the PC 10.

The WiFi module 248, on the other hand, is an alternative communication module to the USB ISP bridge 260. The WiFi module 248 can connect to any external WiFi network, and even to the Internet ultimately, and any updated data information and programs, etc. can be downloaded, to update the content of the flash memory 250. The WiFi module includes but not limited to the module using 802.11a/b/g/n technologies.

In operation, when the user points the pen 200 at a desired geographic location of the world map 150, or the local map 140, the sensor module 220 at the pen tip captures the index dots printed over that position and then outputs the associated 8-bit raw data through a 2-bit data bus from the CMOS sensor 221 to the image processor 240. In response, the image processor 240 decodes the raw data received from the sensor module 220 using a specific signal processing algorithm and then passes the decoded data to the wireless transmitter 245. The wireless transmitter 245 will then transmit the decoded data to the wireless receiver 246 and the data will finally be transmitted to the MCU 230.

The user can also select the desired activity and data type by tapping the pen 200 at the relevant button 161/162/163/164/165 on the operation panel 160. In doing so, the pen's sensor module 220 captures the associated dot code and outputs the corresponding raw data to the image processor 240 and then the image processor 240 decodes the raw data and passes the decoded data to the wireless transmitter 245. The wireless transmitter 245 will then transmit the decoded data to the wireless receiver 246 and the data will finally be transmitted to the MCU 230.

The aforesaid selections of geographic location and of activity and data type can be performed in the reversed order. At the completion of these two user's actions, the MCU 230 will recognize and act on the command and data received from the wireless receiver 246 by executing the chosen activity function and retrieving the appropriate text/audio/video/image data file from the flash memory 250 and finally announcing or playing the corresponding video, images, text or audio segment at the speaker 270 and/or the LCD screen 190.

The operation of the subject data retrieval apparatus will now be described in further detail.

There are 31 activities, namely TOUCH (×15), COMPARE (×6), FIND (×6), World News (×1), Amazing Facts (×1), Earth Facts (×1), and Real-time Retrieval (×1) all of which are selectable using the activity buttons 161 to 165. For a first time user, the default age group is "5-8". Upon tapping the Player key 166, the pen 200 will play "To change the number of player, press this button again" and then "Player+One, Two, Three, Four". Upon tapping the "Time" button 161 of the TOUCH activity, the pen 200 will play "Time hasn't been set yet. Please connect to your PC to download our latest information."

Each product of the subject data retrieval apparatus is accompanied by an installation CD for installation before use, including installing an associated operation program and relevant drivers, etc. on the PC 10 for use with the pen 200 and loading an initial set of data information (from the CD) into the pen's flash memory 250. A unique access code is assigned to the apparatus, as appearing on the CD cover. The user should initially enter the access code into the operation program and then follow the on-screen instructions to register and activate the code. In particular, the user will be asked to select his/her age group and to press a download button to start download.

In one embodiment, the data retrieval apparatus is accompanied with a "coded" keyboard that can be made from any material, such as paper, rubber or plastic. This optical keyboard can replace a real keyboard, as it is printed with the characters that can be selected, together with the same type of indexed information used for the locations indicators described above for the globe. The characters may be anything that the device manufacturer wishes the user to learn and/or communicate such as letters, numbers, pictures or other symbols and images. Because each character is printed with a corresponding indexed information code that is recognizable with the system, the user can user the pen 200 to scan the characters (i.e. the corresponding indexed information) printed on the paper keyboard. Each scan is equivalent to the inputting of the selected character. If the characters are the same as a traditional keypad or keyboard, then it can be used as such but the hardware cost for the device can be greatly saved while providing the user with full capability of inputting text information. When the user is inputting the access code, he can use the pen 200 and the paper keyboard. In other circumstances such as inputting the SSID and password for the Wifi network, or inputting any information/command to the data retrieval apparatus, the user can always use the optical keyboard and the pen 200. On the other hand, if other types of characters such as images are also provided on the optical keyboard, such as national flags and colours then this optical keyboard becomes a far more useful, versatile and interactive part of the present device and system than merely a replacement of a conventional electronic keyboard. The user can then try to match national flags to geographic areas on the globe, or select the right colours for various national flags. The images provide a substitute for traditional alphanumeric characters, such that even those who do not know the spelling of certain desired input may also be able to do so with a "one-click" action. This is particularly important for the learning convenience and enjoyment of small children or people who speak a different language.

Figure 15:
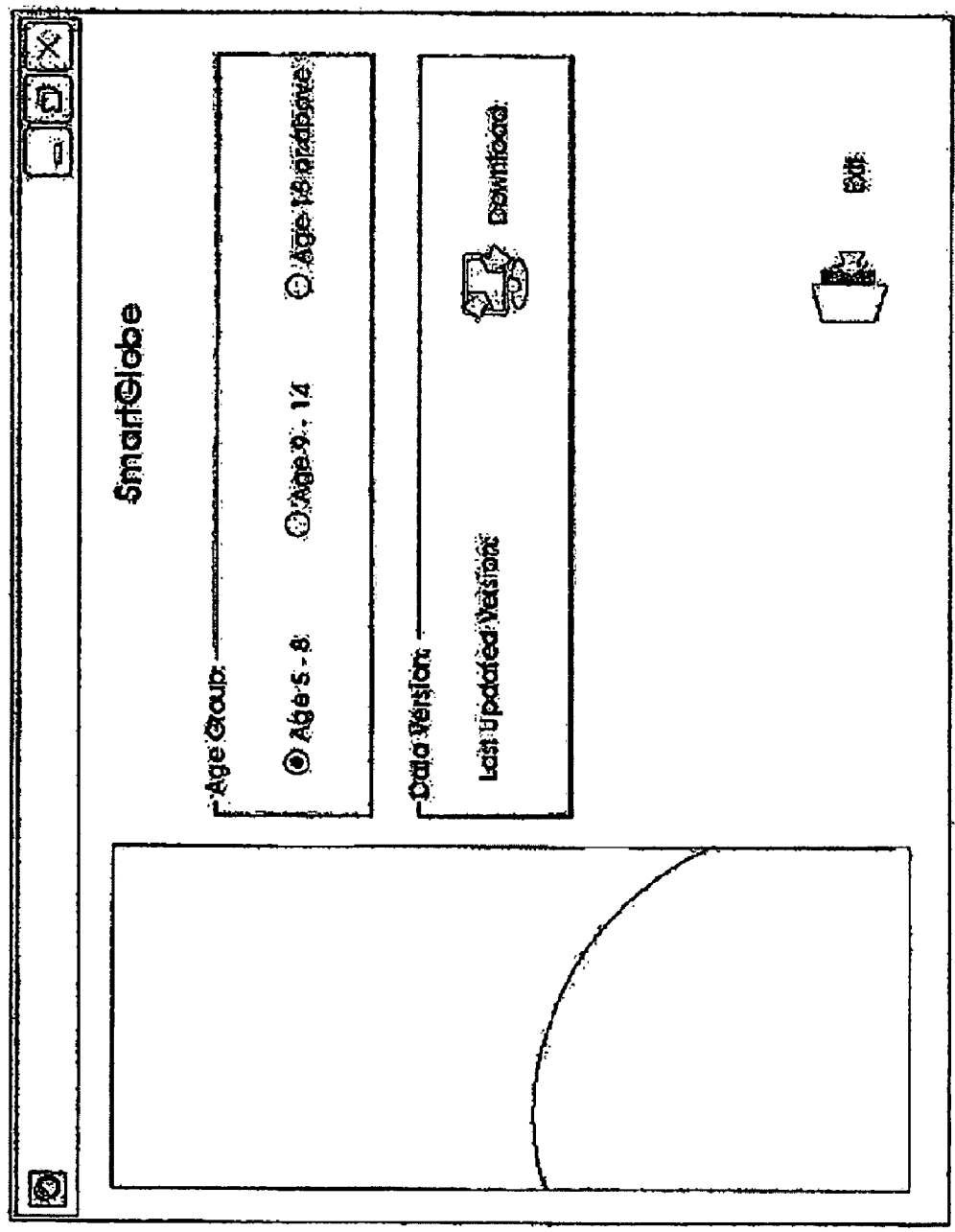
FIG. 15 is a screenshot showing a control panel of an operation program associated with the data retrieval apparatus.

In general, upon connection of the globe 100 to the PC 10 that is in turn connected to the Internet, the operation program automatically runs and pops up a data update screen (FIG. 15) on the PC 10 and automatically checks for update on the server by sending information to the server to verify the content version and data specification. The relevant age group for the player is shown or can be selected on screen. The update checking process is run behind the screen. In case there is update information, the PC 10 will prompt and instruct the user to start download. If update is not necessary, the globe 100 will display on the LCD screen 190 "No new data available". In an alternative way, upon the connection of the globe 100 to a remote WiFi network that is in turn connected to the Internet via the WiFi module 248, the build-in update program in the globe 100 can directly connects to the Internet and performs updating process similar to the one described above.

There are 15 TOUCH activities. While awaiting player's instructions on this game, the globe 100 will play, as appropriate, "Pick an activity, then touch the Globe for more information", "To start your game, press any button to select an activity" and "Then, touch the Globe for more information".

To start the TOUCH game, the player should tap any one of the TOUCH buttons 161 on the globe base 120 and then select a location on the globe body 110. Taking New York as an example, the globe 100 will play the relevant voice segment as indicated in the following table, which shows the voice segments for all of the 15 data types or topics relative to different player age groups "5-8", "9-14" and "15+" (i.e. age 15 or above).

The topic can be changed at any time by tapping another activity button 161, or a different country can be picked by tapping a new location on the world map 150, whereupon the associated new piece of information is announced.

To start the COMPARE game, the player should tap any one of the COMPARE buttons 162 on the globe base 120, whereby the type of information to compare is determined, and then select two locations on the world map 150 (or the local map 140). During selection, the pen 100 will announce the name of the first location immediately upon tapping, then play "second point" to request a second location, and subsequently announce the name of second location immediately upon tapping.

Taking China/India, Japan/Italy and United States/Japan as examples, the following table lists the corresponding voice segments that the globe 100 will play in respect of all of the 6 data types to compare. Different player age groups "5-8", "9-14" and "15+" share the same voice segments.

There are 6 FIND activities, some having three rounds of increasing challenge levels, for up to four players. To start the game, any one of the FIND buttons 163 should be tapped, whereupon the globe 100 will ask a question as shown in the table below and then await an answer. A certain length of time will be given for the player to tap the right place on the globe body 110, namely 90 seconds for the age group "5-8", 60 seconds for the age group "9-14" and 45 seconds for the age group "15+".

In general, ten questions will be asked for each round, except the subject type "Continent" for which there will only be seven questions.

To play the Amazing Facts, the upper KNOWLEDGE button 164 should be pressed using the pen 200, and then the first/next fact will be played. There are up to 20 facts, which will be updated monthly or bi-weekly. The button 164 is touched once for each new fact. The fact will not repeat until the last one has been played. All the age groups are given access to this activity but with different types of data.

To play the World News, the middle KNOWLEDGE button 164 should be pressed using the pen 200, and then the first/next news will be played. There are up to 10 facts, which will be updated monthly or bi-weekly.

To play the Earth Facts, the lower KNOWLEDGE button 164 should be pressed using the pen 200, and then the first/next news will be played. There are up to 20 facts, which will be updated monthly or bi-weekly.

Figure 16:
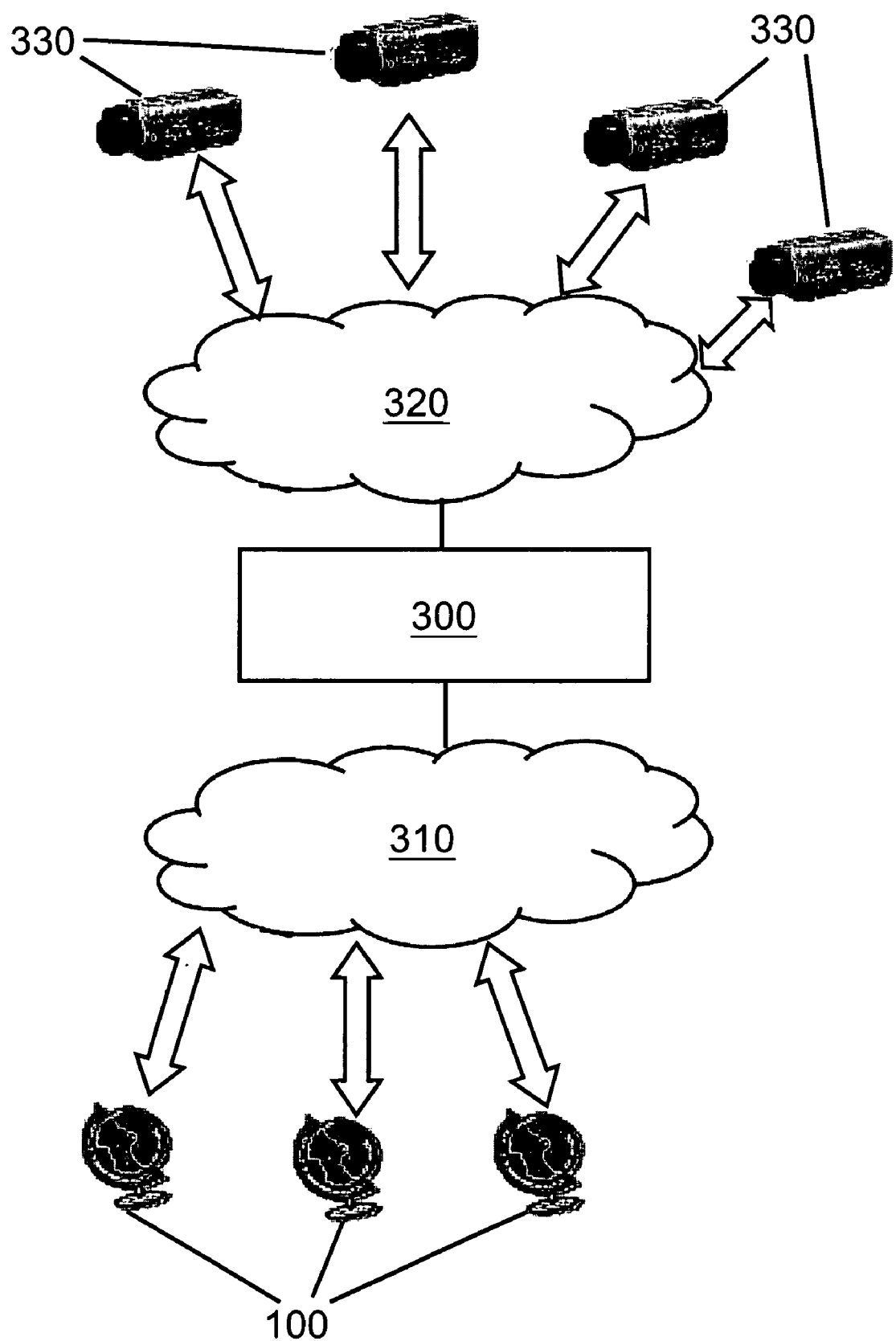
FIG. 16 shows the system block diagram of the data retrieval system in one embodiment.

Now the function of retrieving real-time city scenes, or called City on Demand on the data retrieval apparatus, will be introduced. Referring to FIG. 16, a system for retrieving real-time city scenes includes a central server 300, a first communication network 310, a second communication network 320, a plurality of cameras 330, and at least one geographic globe 100. The first communication network 310 and the second communication network 320 are preferably the Internet. The globe 100 is connected to the first communication network 310 via wired or wireless connection, i.e., through its USB ISP bridge and a PC, or directly though its WiFi module. The globe 100 is communicable with the central server 300. On the other hand, a plurality of cameras 330 are connected through the second communication network 320 to the central server.

The cameras 330 may be installed in different locations in different cities around the world. For example, such cameras can be installed on a bridge, on a city street lamp pole, on a tower, etc. The purpose of these cameras is to capture the scene of the specific city, either in a real-time way or periodically recording.

In operation, when the user of the globe 100 wants to see the real-time or latest scenes of cities around the world, he need to use the pen to point to the city he is interested in on the globe 100, or point to the name of a country if he wish to randomly view the scenes of cities in that country. In the next step, the button 165 should be pressed using the pen, and then the globe 100 will connect to the Internet and access the server 300 to search and download the camera video or still images for the selected city. Alternatively, the globe 100 can also download the camera video, still images or any other data information through the USB ISP bridge 260 which further connected to the PC 10 and thus ultimately connected to the Internet.

There are many ways for the central server 300 to store the camera video or still images collected from different cameras 330 around the world. For example, the server 300 can use real-time streaming technology and provide the globe 100 a streaming connection to view the real-time scenes from the cameras, upon user's selection of a specific city. Alternatively, the central server can obtain from all the cameras 330 over the world periodically by itself. When there is a user request come to the central server 330, the central server 330 will provide a uploading connection for the globe 100, and the globe 100 can download the latest video clip or still images through the internet.

When the globe 100 obtained the video or still images content through the central server 330, it will display these contents on the LCD screen and/or play the audio through the audio speaker. Thus, the user can view the real-time scenes of any city in the world at any time, which is an intuitive and educational way to learn the knowledge of the world's cities.

There could be many ways of how the user viewing the scenes of a city on the globe 100. If there are many cameras 330 located in different place of the city, the user can view the camera videos which are automatically switched periodically such that all the cameras videos can be viewed. Alternatively, the user can even choose which(s) camera's video he wishes to watch on the globe 100.

In one exemplary embodiment, the globe 100 can further download other types of contents related to the specific city the user selected through the Internet. For example, photographs, articles, tour guides, etc, can be downloaded to the globe 100 and the user of the globe 100 can view them.

In another embodiment, the globe 100 is capable of receiving the input from the user as to control the angle/orientation of the specific camera that he is currently watching. Such input commands will be transmitted to the camera 330 via the central server 300, and the camera 330 will acts according to the command by its mechanical device.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

In this particular embodiment, a globe (100) is employed as the base unit of the subject data retrieval apparatus such that the users can have a feel of geographical locations and directions around the planet. It is envisaged that the base unit can take the form of a book or bound charts, such as a world atlas (akin to the local map 140) so that more encoded index information can be packed into a smaller size.

It should be noted that any other suitable coding schemes for the index information may be adopted, which do not require electrical wire/cable connection of the handheld operator to the base unit.

In the preferred embodiment described above, both the first communication network 310 and the second communication network 320 are the Internet. However, one skilled in the art should realize that these two networks might not be necessarily the same network as the Internet. Other types of networks, such as WAN (Wide Area Network), MAN (Metropolitan Area Network), etc, can be used as the first communication network or second communication network.

The subject matter of the data handled by the subject apparatus is unlimited. For example, the base unit can depict a zoo/jungle or animals around a globe, in that the animals are encoded with respective indexes for selective input to the handheld operator to prompt the operator to retrieve and play the relevant pre-recorded voice information relating to those animals, such as their names and habitat.

The globe 100 communicates with the PC 10 via USB connection. It is envisaged that the communication can be implemented using wireless connection technologies, such as the 2.4 GHz radio frequency protocol or the Bluetooth technology, in which case the bridge 260 is replaced by a suitable RF transceiver or Bluetooth module. In a similar way, the WiFi module 248 could be replaced by any other viable technologies such as cellular network module, Wi-max module or UWB module to provide network connection to the remote network.

What is claimed is:

1. A data retrieval system comprising:
 a) a data retrieval apparatus comprising a base unit having a spherical body having a map of the world, whose surface bearing a predetermined set of optically coded index information on geographical areas on said spherical body; said base unit further comprising:
  i) a memory device for storing data information associated with said optically coded index information, said data information comprising voice data information;
  ii) a controller for retrieving from the memory device the data information;
  iii) a first wireless receiver connected to said controller;
  iv) a second wireless transceiver for communicating with a remote network; said second wireless transceiver connected to said controller;

v) a display unit, said display unit connected to said controller;

vi) a voice output unit connected to said controller:

b) a handheld operator, said operator further comprising:

i) an optical sensor for optically sensing said optically coded index information when the sensor is brought close to the surface of the base unit;

ii) a first wireless transmitter, said first transmitter sending said optically coded index information to said first wireless receiver in said base unit;

wherein when said first wireless receiver receives said optically coded index information from said first wireless transmitter, said controller retrieves from said memory device the data information based on a first reference to said optically coded index information sensed by said sensor, displays said data information on said display unit and outputs said voice data information on said voice output unit;

c) a first network connected to said data retrieval apparatus;

d) a central server connected to said first network; and e) a second network connected to said central server containing data information and image corresponding to said sensed optically coded index information;

wherein when said user selects a piece of said optically coded index information on said data retrieval apparatus, said data retrieval apparatus requests and receives from said central server said the data information and image, whereby said data information corresponding to any selected location can be displayed by said data retrieval apparatus and output by said audio output unit.

2. The data retrieval system of claim 1, wherein the base unit includes a second surface bearing a predetermined set of type information representing a plurality of types of the data information, for sensing by the sensor of the operator as a second reference, in conjunction with the first reference, for the controller to retrieve the data information.

3. The data retrieval system of claim 2, wherein the base unit includes a bottom part for supporting the body, the bottom part including the second surface.

4. The data retrieval system of claim 3, wherein the bottom part includes a third surface bearing a predetermined set of further optically coded index information in the form of a relatively more detailed map of a specific part of the world, for sensing by the sensor of the operator, as an alternative reference to the first reference, for retrieval of the data information by the controller.

5. The data retrieval system of claim 4, wherein the second surface is an outer surface of the bottom part and the third surface is an inner surface of the bottom part that is mechanically revealable by a user.

6. The data retrieval system of claim 5, wherein the bottom part has a member including the third surface and movable to reveal the third surface.

7. The data retrieval system of claim 1, wherein the optically coded index information is printed on the surface as dots arranged in repeating patterns.

8. The data retrieval system of claim 2, wherein the type information is printed on the second surface as dots arranged in repeating patterns.

9. The data retrieval system of claim 4, wherein the optically coded index information is printed on the third surface as codes dots arranged in repeating patterns.

10. The data retrieval system of claim 7, wherein said dots comprise indiscernible dots on graphic or pictorial images.

11. The data retrieval system of claim 4, wherein said data retrieval apparatus further contains a fourth surface which is detachable from said data retrieval apparatus, wherein letters, numbers or characters are printed on said fourth surface as codes; whereby said fourth surface in combination with the operator may be used as an input device.

12. The data retrieval system of claim 1, wherein said display unit is a liquid crystal display screen.

13. The data retrieval system of claim 1 wherein said second wireless transceiver is a Wifi module.

14. The data retrieval system of claim 1, wherein said central server is further connected to a plurality of cameras, said plurality of cameras being connected to said central via said second network; each said camera adapted to obtain images of a pre-determined view; said images matched to a corresponding piece of said optically coded index information and data information.

15. The data retrieval system of claim 14, wherein said a plurality of cameras are placed in different places in different cities or geographical area.

16. The data retrieval system of claim 15, wherein said first and second network are the Internet.

17. The data retrieval system of claim 14, wherein said central server stores a predetermined duration of data information of every said camera.

18. The data retrieval system of claim 14, wherein said data retrieval apparatus retrieves real-time data information from said cameras.

19. The data retrieval system of claim 14, wherein said data retrieval apparatus further retrieves text or graphical information from the Internet according to said sensed optically coded index information.

* * * * *